US008531073B2

(12) United States Patent
Mai et al.

(10) Patent No.: US 8,531,073 B2
(45) Date of Patent: Sep. 10, 2013

(54) HEAT DISSIPATION SYSTEM AND FAN THEREOF

(75) Inventors: Sheng-En Mai, Taoyuan Hsien (TW); Kun-Chou Lee, Taoyuan Hsien (TW); Shin-Ming Huang, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 193 days.

(21) Appl. No.: 12/952,850

(22) Filed: Nov. 23, 2010

(65) Prior Publication Data

US 2011/0156520 A1 Jun. 30, 2011

(30) Foreign Application Priority Data

Dec. 25, 2009 (CN) .......................... 2009 1 0262180

(51) Int. Cl.
*H02K 21/12* (2006.01)

(52) U.S. Cl.
USPC ........................................ 310/156.09; 310/90

(58) Field of Classification Search
USPC ...................... 310/156.08–156.14, 61, 62, 90
See application file for complete search history.

(56) References Cited

U.S. PATENT DOCUMENTS

| | | | | |
|---|---|---|---|---|
| 3,882,335 | A * | 5/1975 | Fries | 310/61 |
| 5,982,064 | A * | 11/1999 | Umeda et al. | 310/90 |
| 7,345,386 | B2 * | 3/2008 | Dano et al. | 310/61 |
| 7,462,965 | B2 * | 12/2008 | Natsuhara et al. | 310/64 |
| 7,629,717 | B2 * | 12/2009 | Kanei et al. | 310/64 |
| 8,164,226 | B2 * | 4/2012 | Wu et al. | 310/64 |

* cited by examiner

*Primary Examiner* — Thanh Lam

(74) *Attorney, Agent, or Firm* — Muncy, Geissler, Olds & Lowe, PLLC

(57) ABSTRACT

A fan including an impeller structure, a rotor structure and a stator structure is disclosed. The impeller structure includes a hub and a plurality of blades disposed around the outer periphery of the hub. The rotor structure includes a shaft and a magnetic element. The shaft is disposed through the magnetic element and connected to the hub. The magnetic element includes at least one terminal surface in the axial direction, and at least one receptacle is formed on the terminal surface. The stator structure is disposed around the outer periphery of the magnetic element. The heat dissipation system and the fan thereof can improve the reliability of the motor at high rotating speed effectively and prolong the lifetime of the shaft.

17 Claims, 5 Drawing Sheets

HEAT DISSIPATION SYSTEM AND FAN THEREOF

CROSS REFERENCE TO RELATED APPLICATIONS

This Non-provisional application claims priority under 35 U.S.C. §119(a) on Patent Application No(s). 200910262180.X, filed in People's Republic of China on Dec. 25, 2009, the entire contents of which are hereby incorporated by reference.

BACKGROUND OF THE INVENTION

1. Field of Invention

The present invention relates to a heat dissipation system and a fan thereof and, in particular to a heat dissipation system and a fan thereof including an internal-rotor motor.

2. Related Art

As electronic products progress in their performances, frequencies and calculating speeds and thin sizes, they generate more and more heat in operation resulting in temperature increase. It severely jeopardizes the stability of the electronic products and, meanwhile, reduces their reliability and lifetime. Thus, the heat dissipation has become an important issue for the electronic products. Because fans have advantages of low production cost, technology development and so on, they are frequently used in electronic devices for heat dissipation.

Generally speaking, the fan uses a motor as a power source. The motor includes a rotor magnet, a stator coil and other structures, whose arrangement are used to classify the motors into two major categories, the external-rotor motors and the internal-rotor motors. Recently, the external-rotor motors are applied wildly in industry. However, since their rotor magnets are disposed outside the stator coils and distant from the axle center of the shaft (that is, the rotating radiuses of the rotor magnets in the external-rotor motors are larger), the rotational inertias of the rotor magnets are increased and further larger vibrations are frequently generated at high rotating speed.

Accordingly, as the motor rotates at higher speed, the requirement of the run-out of the rotor magnet is very critical correspondingly. It increases the cost of mold and the difficulty of production. Moreover, if the side run-out of the rotor magnet is too large, the shaft has to bear an even higher impact force resulting from the vibration. In addition, during the external-rotor motor operates at high speed, the heat generated from the copper wire of the stator coil cannot be dissipated effectively and thereby accumulates inside the motor. It shortens the lifetime of the shaft and causes the abnormality of other elements, and further reduces the integral reliability and efficiency of the fan.

In summary, the replacement of the external-rotor motor by the internal-rotor motor to change the position of the rotor magnet can effectively solve most of the aforementioned issues. However, the rotational balance of the internal-rotor motor also has to be adjusted in response to the trend of operation with higher and higher rotating speed. In addition, the heat generated from the copper wire of the stator coil also has to be dissipated effectively to prevent heat accumulation inside the motor resulting in the abnormality of the shaft and other elements. However, no internal-rotor motor able to solve the aforementioned issues appropriately exists nowadays.

Therefore, a heat dissipation system and a fan thereof able to effectively increase the reliability of the motor and prolong the lifetime of the shaft at high rotating speed has been desired.

SUMMARY OF THE INVENTION

In view of the foregoing, the present invention is to provide a heat dissipation system and a fan thereof able to effectively increase the reliability of the motor and prolong the lifetime of the shaft at high rotating speed.

To achieve the above, the present invention provides a fan including an impeller structure, a rotor structure and a stator structure is disclosed. The impeller structure includes a hub and a plurality of blades. The blades are disposed around the outer periphery of the hub, and one of the blades is higher than the stator structure in vertical direction. The rotor structure includes a shaft and a magnetic element. The shaft is disposed through the magnetic element and connected to the hub. The shaft includes at least one groove disposed at the junction of the shaft and the magnetic element. The magnetic element includes at least one terminal surface in the axial direction, and at least one receptacle is formed on the terminal surface. In one embodiment of the present invention, the terminal surface of the magnetic element includes an outer ring part, and the outer ring part is disposed around the terminal surface along the outer diameter of the magnetic element to form the receptacle. In another embodiment of the present invention, the receptacle of the terminal surface includes a plurality of ribs to divide the receptacle into a plurality of small partitions.

In addition, the stator structure is disposed around the outer periphery of the magnetic element. The stator structure includes a top part, and the hub comprises a bottom part. A gap is formed between the top part and the bottom part in horizontal direction. In one embodiment of the present invention, the stator structure includes a plurality of silicon steel plates and a coil assembly winding around the silicon steel plates. The silicon steel plates form an opening, and the stator structure is disposed through the opening.

The fan further includes a motor housing, and the rotor structure and the stator structure are disposed in the motor housing. The shaft of the rotor structure passes through the motor housing. The motor housing includes at least one side surface including at least one hole.

The fan further includes at least one bearing and one bearing bushing. The bearing is disposed in the bearing bushing, and the bearing bushing is connected to the motor housing. The shaft is disposed through the bearing.

To achieve the above, the present invention also provides a heat dissipation system including at least one fan, a plurality of static blades and a frame body. The fan includes an impeller structure, a rotor structure and a stator structure. The impeller structure includes a hub and a plurality of blades. The blades are disposed around the outer periphery of the hub, and one of the blades is higher than the stator structure in vertical direction. The rotor structure includes a shaft and a magnetic element. The shaft is disposed through the magnetic element and connected to the hub. The shaft includes at least one groove disposed at the junction of the shaft and the magnetic element. The magnetic element includes at least one terminal surface in the axial direction, and at least one receptacle is formed on the terminal surface. In one embodiment of the present invention, the terminal surface of the magnetic element includes an outer ring part, and the outer ring part is disposed around the terminal surface along the outer diameter of the magnetic element to form the receptacle. The receptacle of the terminal surface includes a plurality of ribs to divide the receptacle into a plurality of small partitions.

In addition, the stator structure is disposed around the outer periphery of the magnetic element. The stator structure includes a top part, and the hub includes a bottom part. A gap is formed between the top part and the bottom part in horizontal direction. In one embodiment of the present invention, the stator structure includes a plurality of silicon steel plates and a coil assembly winding around the silicon steel plates. The silicon steel plates form an opening, and the stator structure is disposed through the opening. Moreover, the static blades are disposed around the outer periphery of the fan. The fan and the static blades are disposed in the frame body, and connected to the fan and the static blades respectively.

The fan further includes a motor housing, and the rotor structure and the stator structure are disposed in the motor housing. The shaft of the rotor structure passes through the motor housing. The motor housing includes at least one side surface including at least one hole.

The fan further includes at least one bearing and one bearing bushing. The bearing is disposed in the bearing bushing, and the bearing bushing is connected to the motor housing. The shaft is disposed through the bearing.

In summary, since the heat dissipation system and the fan thereof in accordance with the present invention include the receptacle on the terminal surface of the magnetic element of the rotor structure in the axial direction for containing a balance material, the rotor structure can be tested for its dynamic balance before the assembly of the motor and, furthermore, the balance material can be filled into the receptacle to maintain the rotor structure in good dynamic balance at high rotating speed. It effectively prevents the lifetime of the shaft from being shortened by vibration. Moreover, the heat generated from the coil of the stator structure of the fan and the heat dissipation system thereof in accordance with the present invention can be dissipated positively with the air flow generated during the fan is in operation. It protects the lifetime of the shaft and the normal functions of other elements against the damage resulting from the accumulation of heat inside the motor. Accordingly, the heat dissipation system and the fan thereof in accordance with the present invention are able to effectively increase the reliability of the motor and prolong the lifetime of the shaft at high rotating speed.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
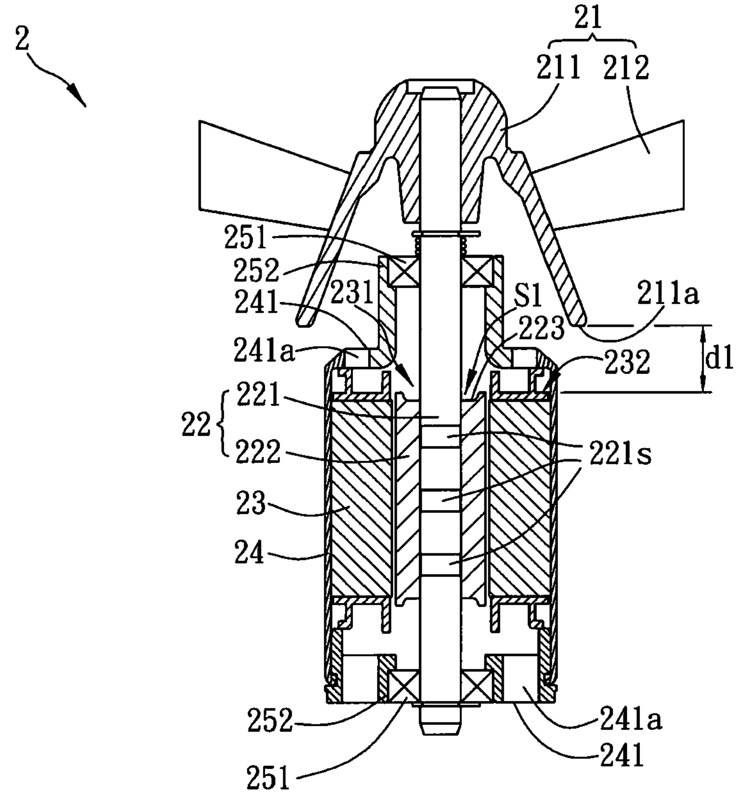
FIG. 1 is a cross-sectional figure of a fan in accordance with a preferable embodiment of the present invention.

FIG. 1 is a cross-sectional figure of a fan 2 in accordance with one preferable embodiment of the present invention. The fan 2 includes an impeller structure 21 and an internal-rotor motor. The internal-rotor motor includes a rotor structure 22 and a stator structure 23.

The impeller structure 21 includes a hub 211 and a plurality of blades 212 disposed around the outer periphery of the hub 211. The material of the hub 211 and the blades 212 includes, for example, aluminum, aluminum magnesium alloy or plastic. The hub 211 and the blades 212 can be integrally formed as one piece, or can be two separated elements initially and then be combined with each together. The hub 211 can be connected to the blades 212 by, for example but not limited to, locking or injection molding.

The rotor structure 22 includes a shaft 221 and a magnetic element 222. The shaft 221 is disposed through the magnetic element 222 and connected to the hub 211. The hub 211 can be connected to the shaft 221 by, for example, mounting, locking or adhesion.

The shaft 221 includes at least one groove 221s disposed at the junction of the shaft 221 and the magnetic element 222. In the present embodiment, three grooves 221s are taken for example and disposed at the junction. However, the amount of the grooves 221s is not only limited to three. The disposition of the grooves 221s expands the combination area between the shaft 221 and the magnetic element 222 and thereby improves the combination force between the shaft 221 and the magnetic element 222 as the shaft 221 is connected to the magnetic element 222 by adhesion.

The magnetic element 222 of the present invention can be, for example, an annular magnetic body with hollow cylindrical structure, and disposed around the shaft 221 corresponding to the stator structure 23. The material of the magnetic body 222 includes, for example, ferrite, soft ferrite magnet, highly magnetic alloy, magnetic material or a combination thereof.

Figure 2A:
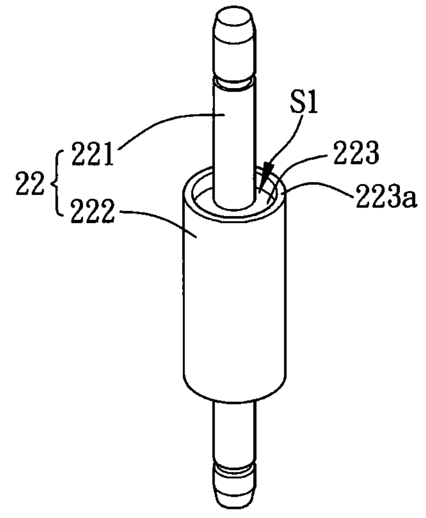
FIG. 2A is an enlarged figure of the rotor structure shown in FIG. 1.

FIG. 2A is an enlarged figure of the rotor structure 22 shown in FIG. 1. The magnetic element 222 includes at least one terminal surface 223 in the axial direction, and at least one receptacle S1 is formed on the terminal surface 223. One terminal surface 223 is respectively formed on the top side and the bottom side of the magnetic element 222, and at least one receptacle S1 is formed on the terminal surface 223. The terminal surface 223 of the magnetic element 222 can include an outer ring part 223*a*, and the outer ring part 223*a* is disposed around the terminal surface 2223 along the outer diameter of the magnetic element 222 to form the aforementioned receptacle S1.

Figure 2B:
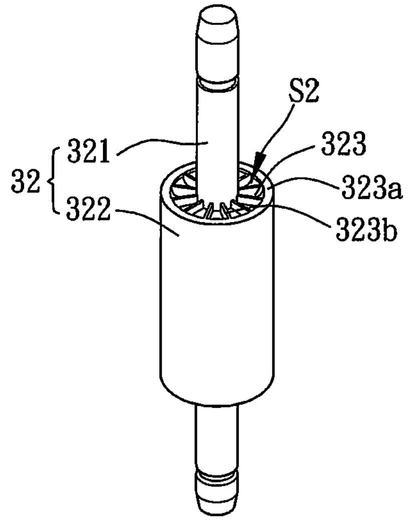
FIG. 2B is an enlarged figure of another aspect of the rotor structure in accordance with the preferably embodiment of the present invention.
Figure 2C:
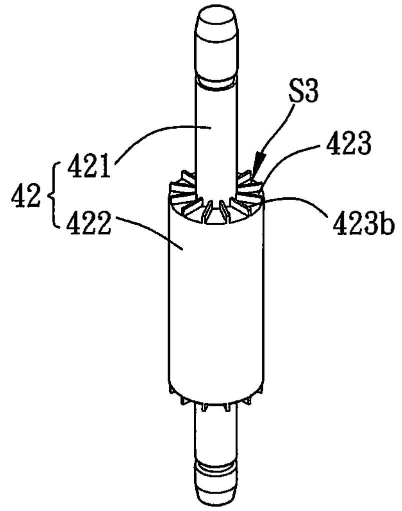
FIG. 2C is an enlarged figure of other aspect of the rotor structure in accordance with the preferably embodiment of the present invention.

However, the rotor structure in accordance with the present invention can have different aspects. As shown in FIG. 2B, the receptacle S2 of the terminal surface 323 includes a plurality of ribs 323*b* to divide the receptacle S2 into a plurality of small partitions. Alternatively, as shown in FIG. 2C, the receptacle S3 of the terminal surface 423 includes a plurality of ribs 423*b* to divide the receptacle S3 into a plurality of small partitions.

Therefore, the receptacle (such as the aforementioned receptacles S1, S2, S3, or the small partitions formed by the ribs 323*b* or 423*b*) formed on the terminal surface in the axial direction of the magnetic element in accordance with the present invention can be used to contain the balance material. Thus, the rotor structure can be tested for its dynamic balance before the assembly of the motor, and the balance material can be filled into the receptacle to maintain the rotor structure in good dynamic balance at high rotating speed and thereby prevent the lifetime of the shaft from being shortened by vibration.

As shown in FIG. 1, the stator structure 23 includes a plurality of silicon steel plates and a coil assembly winding around the silicon steel plates. The silicon steel plates form an opening 231, and the shaft 221 of the stator structure 22 is disposed through the opening 231. The stator structure 23 is disposed around the outer periphery of the magnetic element 222, and, consequently, the silicon steel plates and the coil assembly of the stator structure 23 are disposed around the outer periphery of the magnetic element 222. The stator structure 23 includes a top part 232, and the hub 211 includes a bottom part 211*a*. A gap d1 is formed between the top part 232 of the stator structure 23 and the bottom part 211*a* of the hub 211 in horizontal direction. In addition, one of the blades 212 is higher than the stator structure 21 and the top part 232 thereof in vertical direction.

The fan 2 of the present embodiment can further include a motor housing 24, and the rotor structure 22 and the stator structure 23 are disposed in the motor housing 24. The shaft 221 of the rotor structure 22 passes through the motor housing 24. The motor housing 24 includes at least one side surface 241 including at least one hole 241*a*. In the present embodiment, the motor housing 24 includes one side surface 241 on the top side and the bottom side respectively and is taken for example. Furthermore, one hole 241*a* is formed on the top side surface and the down side surface 241 respectively.

The fan 2 can further include at least one bearing 251 and one bearing bushing 252. The bearing 251 is disposed in the bearing bushing 252, and the bearing bushing 252 is connected to the motor housing 24. The shaft 221 is disposed through the bearing 251. The fan 2 of the present embodiment includes two bearings 251. One of them is disposed in the bearing bushing 252, and the other is disposed close to the impeller structure 21.

Figure 3:
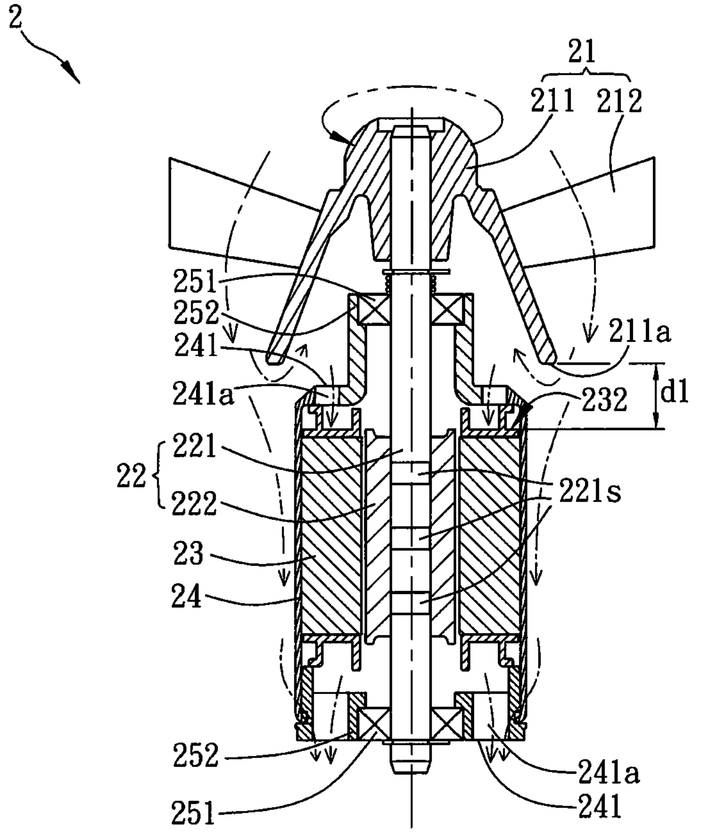
FIG. 3 is a schematic figure of the air flow during the fan shown in FIG. 1 is in operation.

FIG. 3 is a schematic figure of the air flow during the fan 2 shown in FIG. 1 is in operation. Since the gap d1 is formed between the top part 232 of the stator structure 23 and the bottom part 211*a* of the hub 211 in horizontal direction and the one of the blades 212 of the impeller structure 21 is higher than the stator structure 23 and the top part thereof in vertical direction, the downward air flow can be emitted by passing through the gap d1, the hole 241*a* of the top side surface 241 of the motor housing 24, the coil assembly of the stator structure 23, and then the hole 241*a* of the bottom side surface 241 of the motor housing 24 during the fan 2 is in operation. In addition, the heat of the coil assembly can be dissipated from the surface of the motor housing 24 as well.

Accordingly, the heat generated by the coil assembly of the stator structure 23 of the fan 2 in accordance with the present invention can be dissipated with the air flow generated during the fan 2 is in operation. In other words, the configuration of the fan 2 in accordance with the present invention can dissipate the heat generated inside the motor positively and perform better than a conventional fan dissipating heat only by nature cooling. It prevents the accumulation of the heat inside the motor from shortening the lifetime of the shaft and causing the abnormality of other elements.

In addition, the fan 2 in accordance with the present invention is not limited to any specific application, and can be applied in electronic equipment such as heat dissipation systems, computers, optical disk drivers, hard disk drivers, optical devices or color wheels. The appearance and the shape of the fan 2 in accordance with the present invention are not limited as well, and the configuration of the fan 2 can be adjusted in accordance with its practical function and field.

Figure 4A:
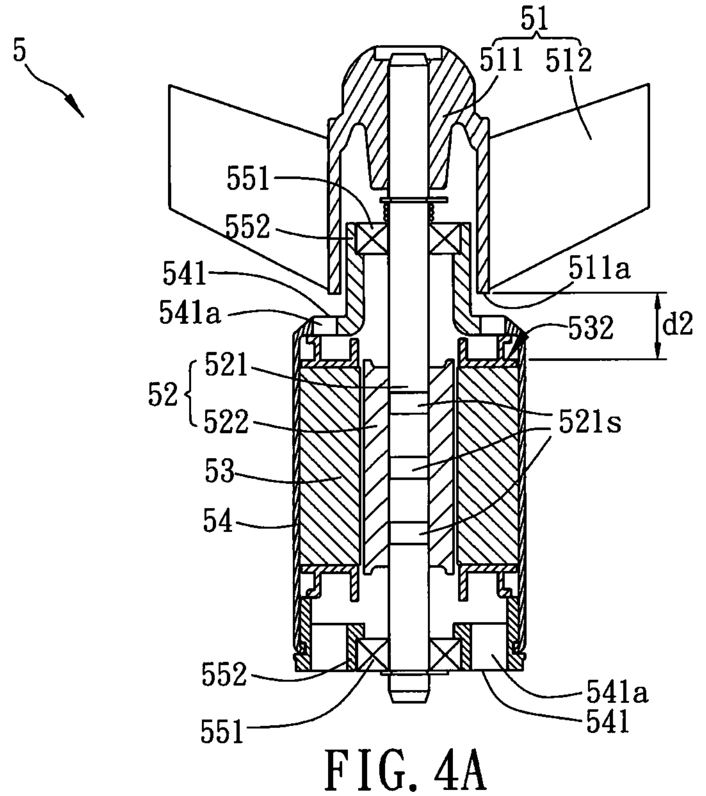
FIGS. 4A and 4B are a cross-sectional figure of another fan 5 in accordance with the preferable embodiment of the present invention and a schematic figure of the air flow during the fan 5 is in operation.
Figure 4B:
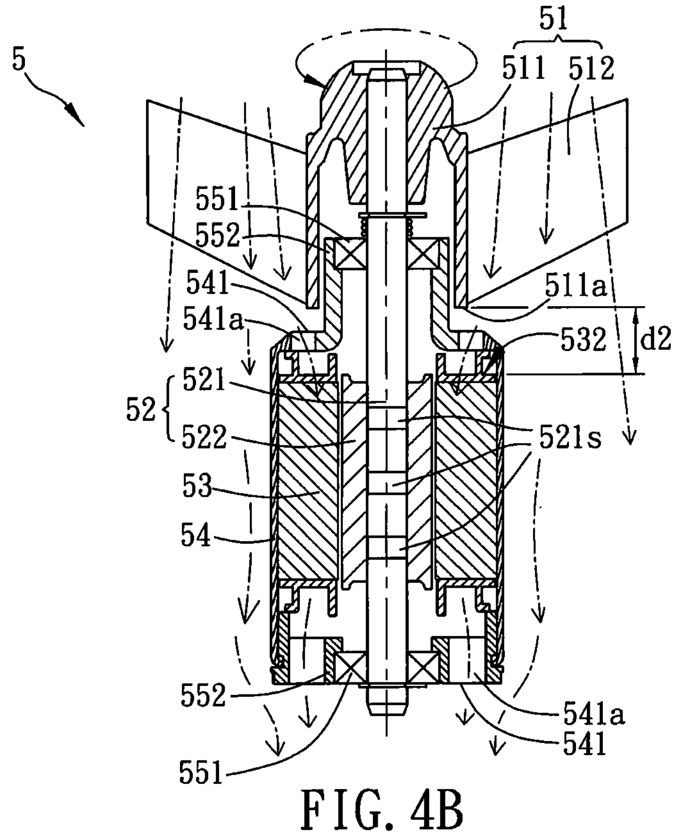

FIGS. 4A and 4B are a cross-sectional figure of another fan 5 in accordance with the preferable embodiment of the present invention and a schematic figure of the air flow during the fan 5 is in operation.

The situation of the fan 5 is similar to that of the aforementioned fan 2. Since the gap d2 is formed between the top part 532 of the stator structure 53 and the bottom part 511*a* of the hub 511 in horizontal direction and one of the blades 512 of the impeller structure 51 is higher than the stator structure 53 and the top part 532 thereof in vertical direction, the downward air flow can be emitted by passing through the gap d2, the hole 541*a* of the top side surface 541 of the motor housing 54, the coil assembly of the stator structure 53, and then the hole 541*a* of the bottom side surface 541 of the motor housing 54 during the fan 5 is in operation.

In addition, the heat of the coil assembly can be dissipated from the surface of the motor housing 54 as well. Accordingly, the heat generated by the coil assembly of the stator structure 53 of the fan 5 in accordance with the present invention can be dissipated with the air flow generated during the fan 5 is in operation. In other words, the configuration of the fan 5 in accordance with the present invention can dissipate the heat generated inside the motor positively and perform better than a conventional fan dissipating heat only by nature cooling. It prevents the accumulation of the heat inside the motor from shortening the lifetime of the shaft and causing the abnormality of other elements.

Figure 5:
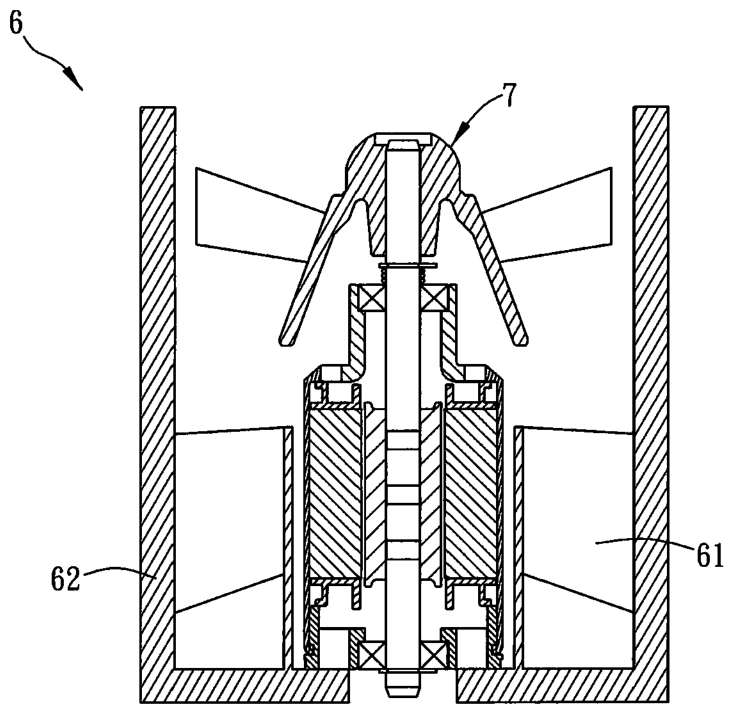
FIG. 5 is a cross-sectional figure of a heat dissipation system in accordance with a preferably embodiment of the present invention.

FIG. 5 is a cross-sectional figure of a heat dissipation system in accordance with the preferably embodiment of the present invention. The heat dissipation system 6 includes at least one fan 7, a plurality of static blades 61 and a frame body 62. In the present embodiment, the heat dissipation system 6 including one fan 7 is taken for exemplary description. In addition, the fan 7 of the present embodiment is provided with all of the technical characteristics of the fan 2 or the fan 5 of the aforementioned embodiment, and the detailed description thereof will be omitted.

The static blades 61 are disposed at the out periphery of the fan 7. Herein, the static blades 61 are disposed around the out periphery of the fan 7. The fan 7 and the static blades 61 are disposed in the frame body 62, and the frame body 62 is connected to the fan 7 and the static blades 61 respectively. The material of the static blades 61 and the frame body 62 can include, for example but not limited to, metal or plastic. In the present embodiment, the static blades and the frame body 62 are integrally formed as one piece. The fan 7 is connected to the frame body 62 by, for example not limited to, locking or injection mounting.

In addition, the heat dissipation system 6 in accordance with the present invention is not limited to any specific application, and can be applied in electronic equipment such as computers, optical disk drivers, hard disk drivers, optical devices or color wheels.

Figure 6:
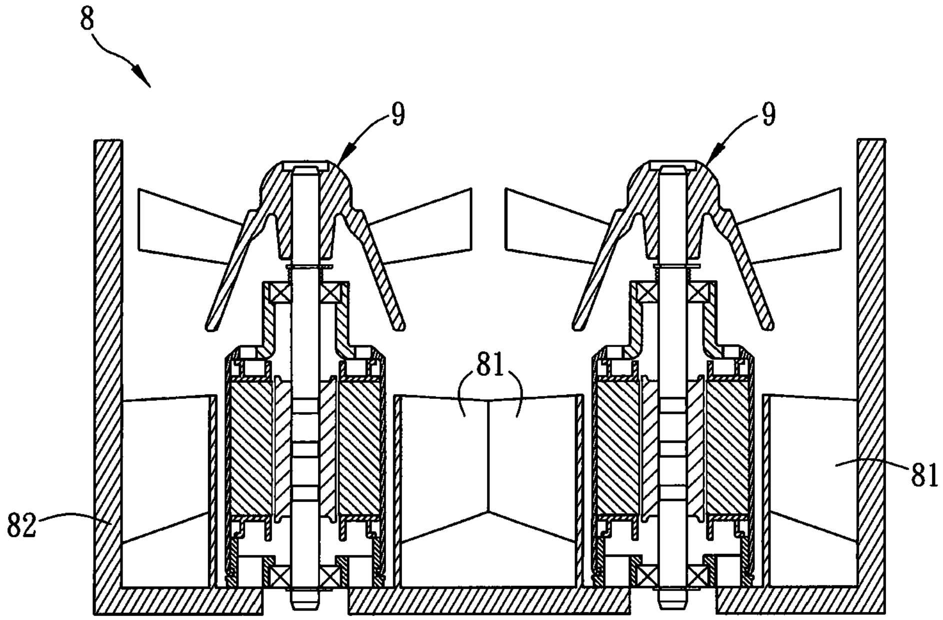
FIG. 6 is a cross-sectional figure of another heat dissipation system in accordance with the preferable embodiment.

FIG. 6 is a cross-sectional figure of another heat dissipation system in accordance with the preferable embodiment. The major difference between the heat dissipation system 8 and the aforementioned heat dissipation system 6 is that the heat dissipation system 8 includes two side-by-side fans 9 disposed in the frame body 82. In addition, the static blades 81 between two fans 9 are connected to each other, and respectively connected to the frame body 82. The fan 9 of the heat dissipation system 8 is provided with all of the technical characteristics of the fan in accordance with the aforementioned embodiment, and the detail description thereof will be omitted.

The heat dissipation system in accordance with the present invention also can include two or more than two fans disposed side-by-side or overlapping to each other in the frame body. Thus, the amount and the arrangement of the fans disposed in the frame body can be adjusted based on the needs of users, and are not limited to the aforementioned.

In summary, since the heat dissipation and the fan thereof in accordance with the present invention include the receptacle on the terminal surface of the magnetic element of the rotor structure in the axial direction for containing a balance material, the rotor structure can be tested for its dynamic balance before the assembly of the motor and the balance material can be filled into the receptacle to maintain the rotor structure in good dynamic balance at high rotating speed. It effectively prevents the lifetime of the shaft from being shortened by vibration. Moreover, the heat generated from the coil of the stator structure of the fan and the heat dissipation system thereof in accordance with the present invention can be dissipated positively with the air flow generated during the fan is in operation. It protects the lifetime of the shaft and the normal functions of other elements against the damage resulting from the accumulation of the heat inside the motor. Accordingly, the heat dissipation system and the fan thereof in accordance with the present invention are able to increase the reliability of the motor and prolong the lifetime of the shaft at high rotating speed effectively.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan, comprising:

an impeller structure comprising a hub and a plurality of blades disposed around the outer periphery of the hub;

a rotor structure comprising a shaft and a magnetic element, wherein the shaft is disposed through the magnetic element and connected to the hub, the magnetic element comprises at least one terminal surface in the axial direction, and at least one receptacle is formed on the terminal surface;

a stator structure disposed around the outer periphery of the magnetic element; and a motor housing in which the rotor structure and the stator structure are disposed, wherein the shaft of the rotor structure passes through the motor housing, the motor housing comprises at least one side surface comprising at least one hole, wherein the motor housing is disposed between the impeller structure and the stator structure.

2. The motor of claim 1, wherein the hub is connected to the shaft by mounting, locking or adhesion.

3. The fan of claim 1, further comprising:

at least one bearing and one bearing bushing, wherein the bearing is disposed in the bearing bushing, the bearing bushing is connected to the motor housing, and the shaft is disposed through the bearing.

4. The fan of claim 1, wherein the shaft comprises at least one groove disposed at the junction of the shaft and the magnetic element.

5. The fan of claim 1, wherein the stator structure comprises a top part, the hub comprises a bottom part, and a gap is formed between the top part and the bottom part in horizontal direction.

6. The fan of claim 1, wherein one of the blades is higher than the stator structure in vertical direction.

7. The fan of claim 1, wherein the magnetic element is a hollow cylindrical structure.

8. The fan of claim 1, wherein the terminal surface of the magnetic element comprises an outer ring part, the outer ring part is disposed around the terminal surface along the outer diameter of the magnetic element to form the receptacle.

9. The fan of claim 8, wherein the receptacle of the terminal surface is used to contain a balance material.

10. The fan of claim 1, wherein the receptacle of the terminal surface comprises a plurality of ribs to divide the receptacle into a plurality of small partitions.

11. The fan of claim 10, wherein the receptacle of the terminal surface is used to contain a balance material.

12. The fan of claim 1, wherein the stator structure comprises a plurality of silicon steel plates and a coil assembly winding around the silicon steel plates, wherein the silicon steel plates form an opening, and the stator structure is disposed through the opening.

13. The fan of claim 1, wherein the material of the hub and the blades comprises aluminum, aluminum magnesium alloy or plastic, and the hub and the blades are integrally formed as one piece.

14. A heat dissipation system, comprising:

at least one fan comprising:

an impeller structure comprising a hub and a plurality of blades disposed around the outer periphery of the hub;

a rotor structure comprising a shaft and a magnetic element, wherein the shaft is disposed through the magnetic element and connected to the hub, the magnetic element comprises at least one terminal surface in the axial direction, and at least one receptacle is formed on the terminal surface;

a stator structure disposed around and corresponding to the outer periphery of the magnetic element; and a motor housing in which the rotor structure and the stator structure are disposed, wherein the shaft of the rotor structure passes through the motor housing, the motor housing comprises at least one side surface comprising at least one hole, wherein the motor housing is disposed between the impeller structure and the stator structure;

a plurality of static blades disposed adjacent to the periphery of the fan; and a frame body in which the fan and the static blades are disposed, wherein the frame body is connected to the fan and the static blades respectively.

15. The heat dissipation system of claim 14, wherein the material of the static blades and the frame body comprises metal or plastic.

16. The heat dissipation system of claim 14, wherein the static blades and the frame body are integrally formed as one piece.

17. The heat dissipation system of claim 14, wherein the fan and the frame body are connected by locking or injection mounting.

* * * * *